United States Patent
Schmidt et al.

(10) Patent No.: US 10,573,937 B2
(45) Date of Patent: Feb. 25, 2020

(54) BATTERY ARRANGEMENT

(71) Applicant: Dr. Ing. h.c. F. Porsche Aktiengesellschaft, Stuttgart (DE)

(72) Inventors: Tim Schmidt, Ludwigsburg (DE); Thierry Mingers, Sospel (FR); Felix Kojokar, Alfdorf (DE); Rolf Esslinger, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 475 days.

(21) Appl. No.: 14/480,880

(22) Filed: Sep. 9, 2014

(65) Prior Publication Data
US 2015/0072199 A1 Mar. 12, 2015

(30) Foreign Application Priority Data
Sep. 9, 2013 (DE) .................. 10 2013 109 808

(51) Int. Cl.
*H01M 2/20* (2006.01)
*H01M 10/48* (2006.01)
*H01M 2/10* (2006.01)
*H01M 10/625* (2014.01)
*H01M 10/6567* (2014.01)
(Continued)

(52) U.S. Cl.
CPC ....... *H01M 10/486* (2013.01); *H01M 2/1083* (2013.01); *H01M 2/206* (2013.01); *H01M 10/425* (2013.01); *H01M 10/613* (2015.04); *H01M 10/625* (2015.04);
(Continued)

(58) Field of Classification Search
None
See application file for complete search history.

(56) References Cited

U.S. PATENT DOCUMENTS

| 2010/0009251 A1 | 1/2010 | Shin |
| 2010/0047676 A1 | 2/2010 | Park et al. |

(Continued)

FOREIGN PATENT DOCUMENTS

| JP | 2003323879 | 11/2003 |
| JP | 2008103239 | 5/2008 |

(Continued)

OTHER PUBLICATIONS

Schroeter et al. (WO 2012062396 A1), Abstract translation and machine translation.*
Translation of Korean Office Action.

*Primary Examiner* — Haixia Zhang
(74) *Attorney, Agent, or Firm* — Gerald E. Hespos; Michael J. Porco; Matthew T. Hespos

(57) ABSTRACT

A battery arrangement (10) for a motor vehicle has a plurality of battery cells (12) for storing electrical energy. Each battery cell (12) has two flexible connection lugs (18) to make electrical contact with the battery cells (12). The battery cells (12) are arranged on surfaces of rigid plate-like frame elements (14). At least one connecting element (20) is arranged on one side of the frame elements (14) and is connected to the frame elements (14). The connecting element (20) is of electrically insulating design and has openings (24) through which the connection lugs (18) are routed. An electrically conductive contact element (28, 30; 42, 44) is secured to the connecting element (20) and electrically contacts the connection lugs (18).

9 Claims, 8 Drawing Sheets

(51) Int. Cl.
*H01M 10/42* (2006.01)
*H01M 10/6554* (2014.01)
*H01M 10/613* (2014.01)

(52) U.S. Cl.
CPC ... *H01M 10/6554* (2015.04); *H01M 10/6567* (2015.04); *H01M 2220/20* (2013.01)

(56) References Cited

U.S. PATENT DOCUMENTS

| | | | |
|---|---|---|---|
| 2012/0064383 A1 | 3/2012 | Tonomura et al. | |
| 2012/0301747 A1* | 11/2012 | Han | H01M 2/1005 |
| | | | 429/7 |
| 2014/0011059 A1* | 1/2014 | Hashimoto | H01M 2/1077 |
| | | | 429/72 |
| 2014/0272495 A1* | 9/2014 | Silk | H01M 10/5004 |
| | | | 429/72 |

FOREIGN PATENT DOCUMENTS

| | | | |
|---|---|---|---|
| JP | 2012079666 | 4/2012 | |
| JP | 2012079666 A | 4/2012 | |
| KR | 20080013040 | 2/2008 | |
| KR | 1020080013040 A | 2/2008 | |
| KR | 1020080036258 A | 4/2008 | |
| KR | 20120132338 | 12/2012 | |
| KR | 1020120132338 A | 12/2012 | |
| WO | 2012062396 | 5/2012 | |
| WO | WO 2012062396 A1 * | 5/2012 | ............ H01M 2/206 |

\* cited by examiner

BATTERY ARRANGEMENT

CROSS REFERENCE TO RELATED APPLICATION

This application claims priority on German Patent Application No. 10 2013 109 808.8, the entire disclosure of which is incorporated herein by reference.

BACKGROUND OF THE INVENTION

1. Field of the Invention

The invention relates to a battery arrangement for a motor vehicle comprising a plurality of battery cells for storing electrical energy. The battery cells each have two flexible connection lugs to make electrical contact with the battery cells. The battery cells are arranged on the surface of rigid plate-like frame elements. At least one connecting element is arranged on one side of the frame elements and is connected to the frame elements.

2. Description of the Related Art

Battery arrangements of the type described above are used to receive and store electrical energy or to provide electrical energy as required.

Battery modules typically are formed from a plurality of individual battery cells and plural battery modules usually are connected mechanically and electrically to one another to provide a battery with a high capacity and a high electrical power.

Individual battery cells typically are formed as flat flexible pouch cells. Each pouch cell typically has two thin contact lugs or two flat contact conductors for the respective positive and negative poles. The contact lugs usually are arranged on opposite ends of the flexible, flat pouch cells.

The pouch cells have to be stabilized mechanically to be integrated in a battery module and the contact lugs have to be connected electrically to one another.

U.S. Pat. No. 7,682,729 proposes accommodating the individual flat battery cells in flat frame elements, routing the contact lug between the frame elements to the adjacent battery cells and connecting them to the adjacent contact lug. A disadvantage is that the contact lugs have to be connected to one another in a complicated manner by soldering or in a similar mechanical manner to form a reliable electrical connection.

An object of the invention is to provide a mechanically stable battery arrangement comprising a plurality of battery cells that can be connected electrically to one another in a reliable manner with a low level of technical expenditure.

SUMMARY OF THE INVETNION

The invention relates to a battery arrangement where the connecting element is of electrically insulating design and has openings through which the connection lugs are routed and secured to the connecting element in a force-fitting manner by means of an electrically conductive contact element.

The frame elements can be fixed mechanically and stabilized by the connecting element, and the connection lugs can be clamped to the connecting element with a low level of technical expenditure by the conductive contact element. As a result, there are no complicated steps, such as soldering, for connecting the contact lugs, and a reliable electrical connection between the connection lugs can be realized with a technically low level of expenditure.

The frame elements and battery cells may be stacked one above the other in layers. Thus, compact battery modules with flat flexible battery cells can be realized.

Two battery cells may be associated with one frame element and may be arranged respectively on opposite surfaces of the frame elements to increase the integration density of the battery cells.

A metallic cooling plate may be arranged between the battery cells to achieve cooling and to prevent overheating of the battery arrangement.

A metallic cooling plate may be arranged on outer surfaces of the battery arrangement to cool the battery arrangement in relation to the surrounding area.

The contact element may be fixed to the connecting element, and at least one of the connection lugs may be secured in a force-fitting manner between webs of the connecting element and the contact element. Thus, the connection lugs of a plurality of battery cells can be connected electrically to one another in a reliable manner in one working step with a low level of expenditure as a result.

The contact element may electrically connect two connection lugs of two battery cells to one another to achieve a series circuit of battery cells.

The contact element that makes contact with a connection lug of a battery cell may have a connection section that forms an electrical contact of the battery arrangement. Thus, electrical contact with the entire battery arrangement comprising the battery cells can be realized with a low level of technical expenditure.

A cover may be arranged on the connecting element so that the contact lugs and the contact element can be insulated electrically from the surrounding area.

Two connecting elements may be secured on opposite sides of the frame elements. Thus, a plurality of battery arrangements can be connected electrically in series in one battery module as a result.

The battery arrangement may have at least one temperature sensor. Thus, the temperature of the battery arrangement can be checked and overheating of the battery arrangement can be prevented.

The battery arrangement may have a cooling water line that is thermally connected to the cooling plates. Thus, heat losses that are produced can be discharged effectively from the battery arrangement.

The battery cells may be flexible battery cells, in particular pouch cells. Thus, the battery arrangement can be produced in a cost-effective manner.

The features mentioned above and those explained below can be used in the respectively indicated combination, but also in other combinations or on their own, without departing from the scope of the invention.

Exemplary embodiments of the invention are illustrated in the drawing and will be explained in greater detail in the following description.

BRIEF DESCRIPTION OF THE DRAWINGS

FIG. 3a is an exploded perspective view of the battery arrangement of FIG. 2 with an insulation cover and FIG. 3b is a perspective view of the assembled battery arrangement of FIG. 3a.

DETAILED DESCRIPTION

Figure 1:
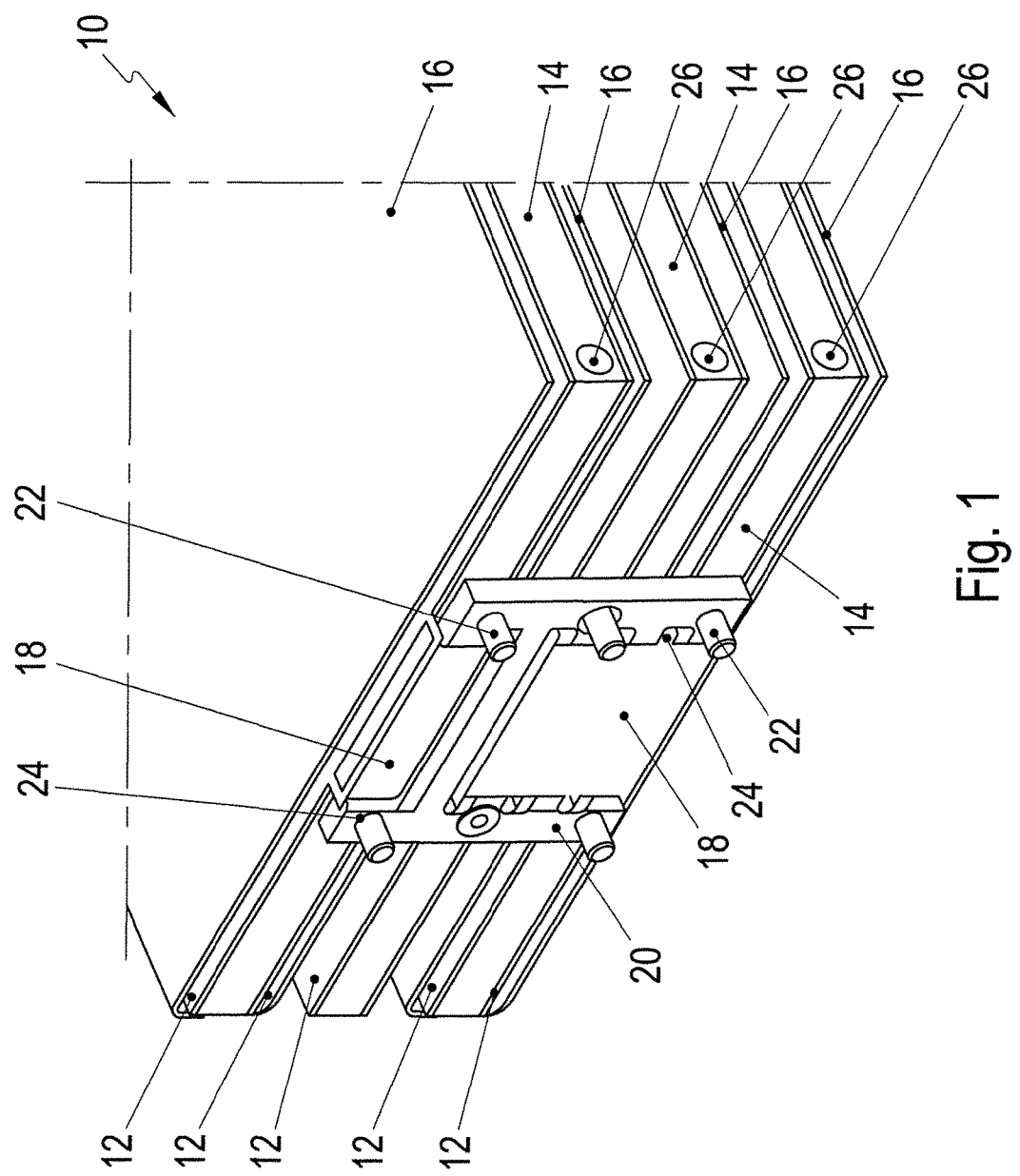
FIG. 1 is a perspective view of a battery arrangement with plural battery cells.

FIG. 1 is a schematic partial view of a battery arrangement denoted generally by the numeral 10. The battery arrangement 10 has a plurality of battery cells 12 in the form of flexible flat cells that are connected together with frame elements 14 in layers. The battery arrangement also has cooling plates 16 arranged together with the battery cells and the frame elements 14 in layers. Each battery cell 12 has two flexible connection lugs or flexible ribbon contacts 18 that are routed out of the battery cells 12 and form the connection contacts of the battery cells 12.

A connecting element 20 is arranged on one side of the battery arrangement 10 and is secured to side surfaces of the frame elements 14 by fastening elements 22. The connecting element 20 has a plurality of elongate recesses or openings 24 through which the flexible connection lugs or ribbon contacts 18 are routed. The connecting element 20 is formed from a rigid, electrically insulating material.

The battery cells 12, the frame elements 14 and the cooling plates 16 are arranged in layers. More particularly, the frame elements 14 are formed from a rigid material and mechanically stabilize the flexible battery cells 12, which are preferably in the form of pouch cells. The cooling plates 16 are formed from a thermally conductive material, such as aluminum or other metal to dissipate heat produced in the battery cells 12 to the outside and to prevent overheating of the battery arrangement 10.

In the embodiment illustrated in FIG. 1, the battery arrangement 10 has three of the frame elements 14, and the battery cells 12 are arranged respectively on opposite surfaces of the frame elements 14. The frame elements 14 connected to the battery cells 12 are arranged one above the other and cooling plates 16 are arranged between the individual frame elements 14. Additionally, one of the cooling plates 16 is arranged on each of the top and bottom sides of the battery arrangement 10. The battery arrangement forms a rigid and mechanically stable arrangement due to the rigid frame elements 14 being fixedly connected to the rigid connecting element 20.

The flexible connection lugs 18 of the battery cells 12 are routed through the openings 24 and bent toward one another to be pressed onto the connecting element 20 by a contact element and, as a result, form a force-fitting connection.

The frame elements 14 have passage holes 26 along one side of the battery arrangement 10, and the battery arrangement 10 can be connected laterally to a second battery arrangement 10 at the holes.

Figure 2:
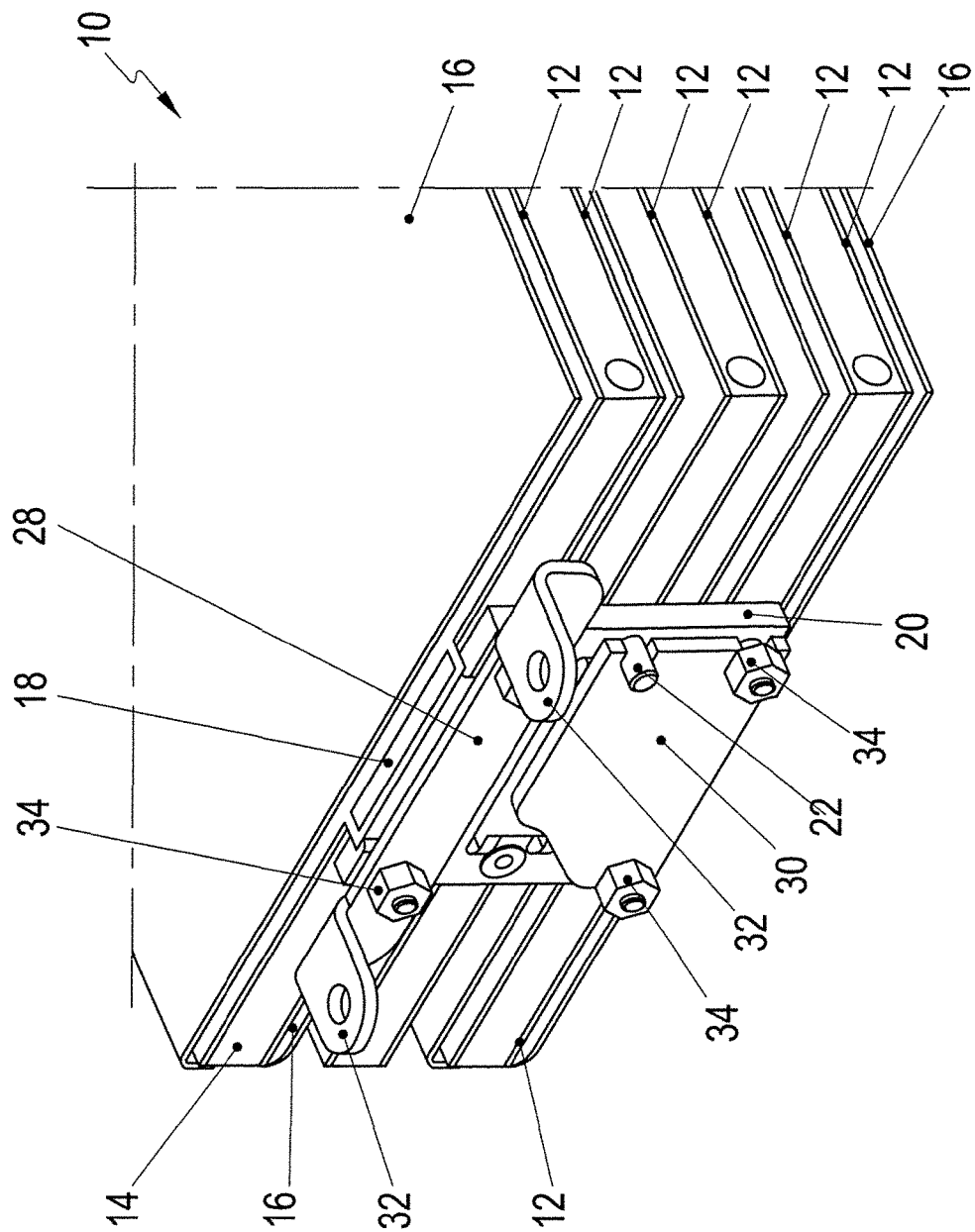
FIG. 2 is a perspective view of the battery arrangement of FIG. 1 with electrical connection elements for electrically contacting contacts of the battery cells.

FIG. 2 is a schematic view of the battery arrangement 10 for explaining how electrical contact is made with the connection lugs 18. Identical elements are denoted by the same reference numerals, with only the special features being explained here.

A first contact element 28 and a second contact element 30 are secured to the fastening elements 22. Each contact element 28, 30 is formed from an electrically conductive material and is pressed onto the connecting element 20 to secure the connection lugs 18 to webs of the connecting element 20 between the openings 24 in a force-fitting manner. The first contact element 28 has two connection sections 32 that are used to connect the connection lugs 18 electrically and to route the corresponding electrical contact out of the battery arrangement 10. The second contact element 30 is a flat element and is pressed onto the connecting element 20 to connect the connection lugs 18 of a plurality of the battery cells electrically to one another and to secure the contact lugs to the connecting element 20 in a force-fitting manner. The contact elements 28, 30 are secured to the connecting elements 20 by nuts 34.

The battery cells 12 can be connected electrically to one another in a series circuit or in a parallel circuit, and the entire package of battery cells 12 can be connected electrically with the package of battery cells from the outside by virtue of the contact elements 28, 30.

Figure 3A:
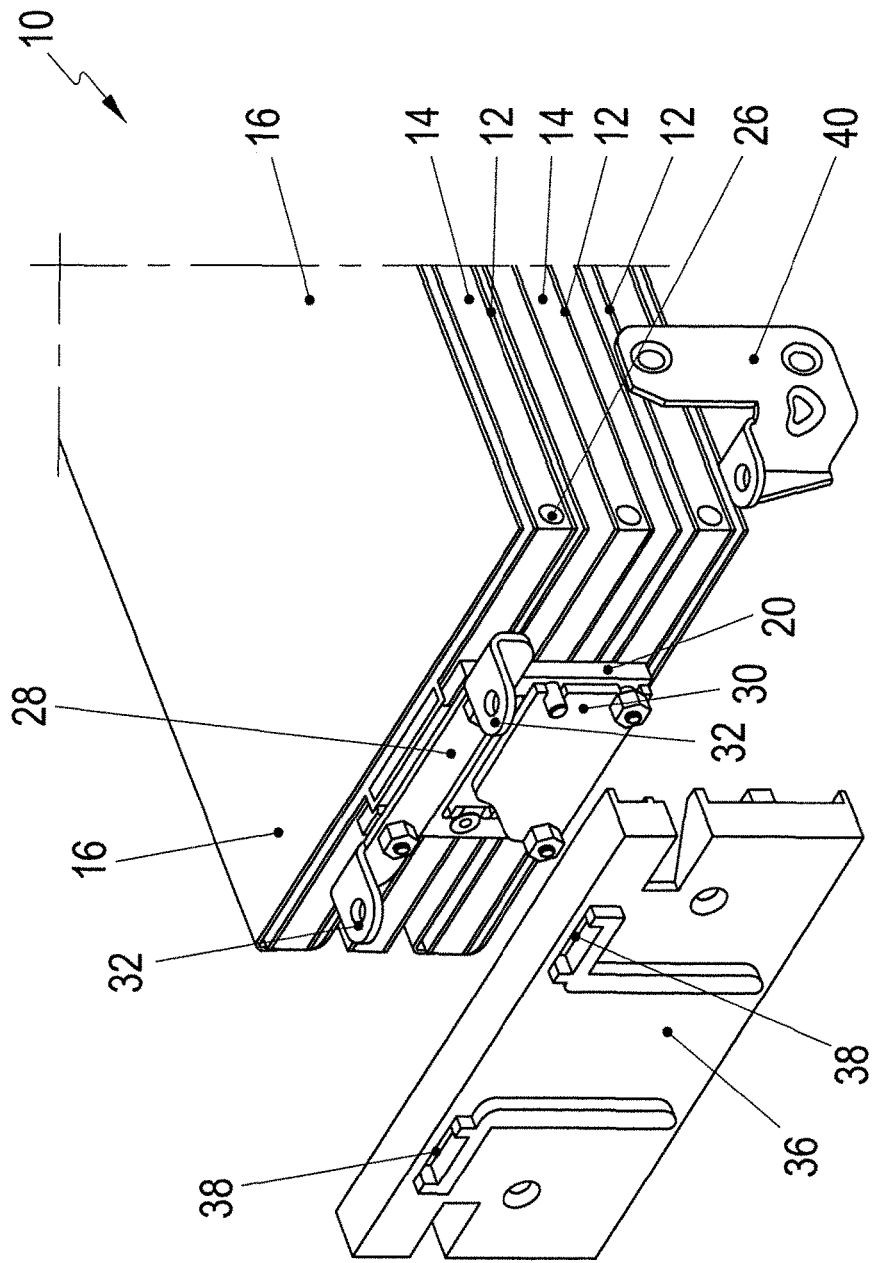
Figure 3B:
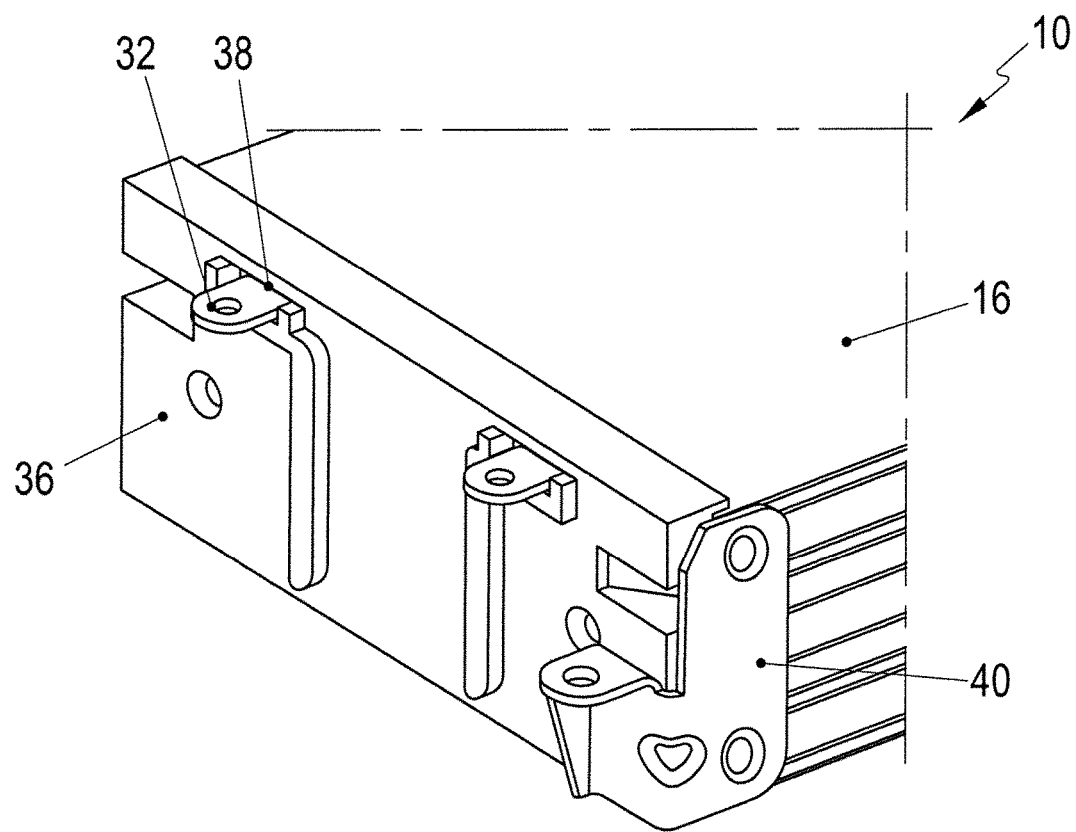

FIGS. 3a and 3b show a further schematic partial view of the battery arrangement 10 in an exploded illustration and in the form of an assembled illustration. Identical elements are denoted by the same reference numerals, with only the special features being explained here.

FIG. 3a shows a cover 36 that is secured by the connecting element 20 to insulate the contact elements 28, 30 from the surrounding area. The cover 36 has two openings 38 through which the connection sections 32 can be routed to connect the battery arrangement 10. FIG. 3a also shows a holding means that can be secured to the frame elements 14 at the holes 26 to fix the cover 36 and to mount or secure the battery arrangement 10 mechanically.

FIG. 3b shows an assembled illustration of the battery arrangement 10 with the connection sections 32 routed through the openings 38 in the cover 36 and therefore accessible from the outside to make electrical contact with the battery arrangement 10. The holding means 40 is secured to the cover 36 to mount the battery arrangement 10 mechanically.

Figure 4A:
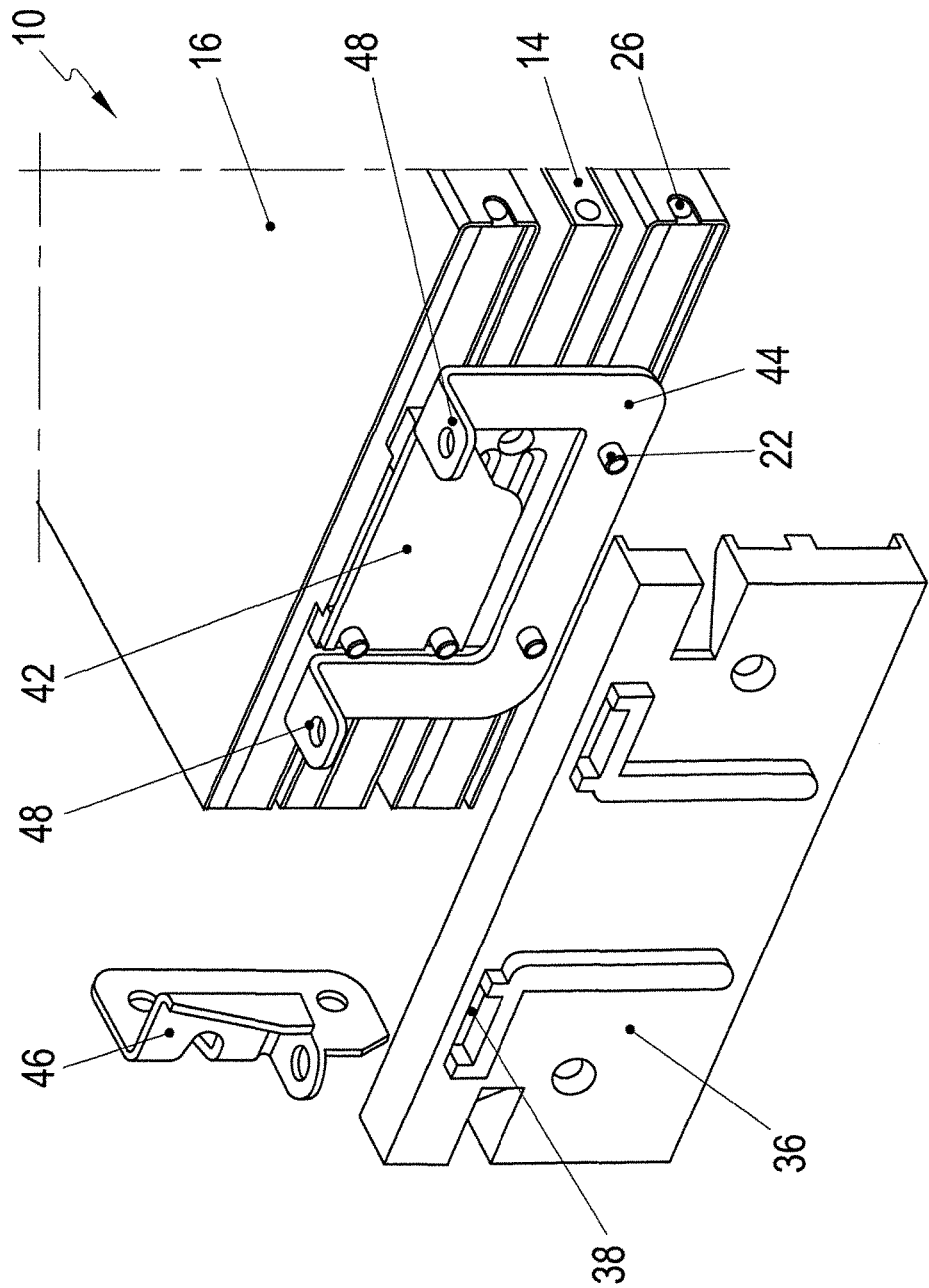
FIGS. 4a and 4b are perspective views similar to FIGS. 3a and 3b, but showing a variant circuit of the battery arrangement.
Figure 4B:
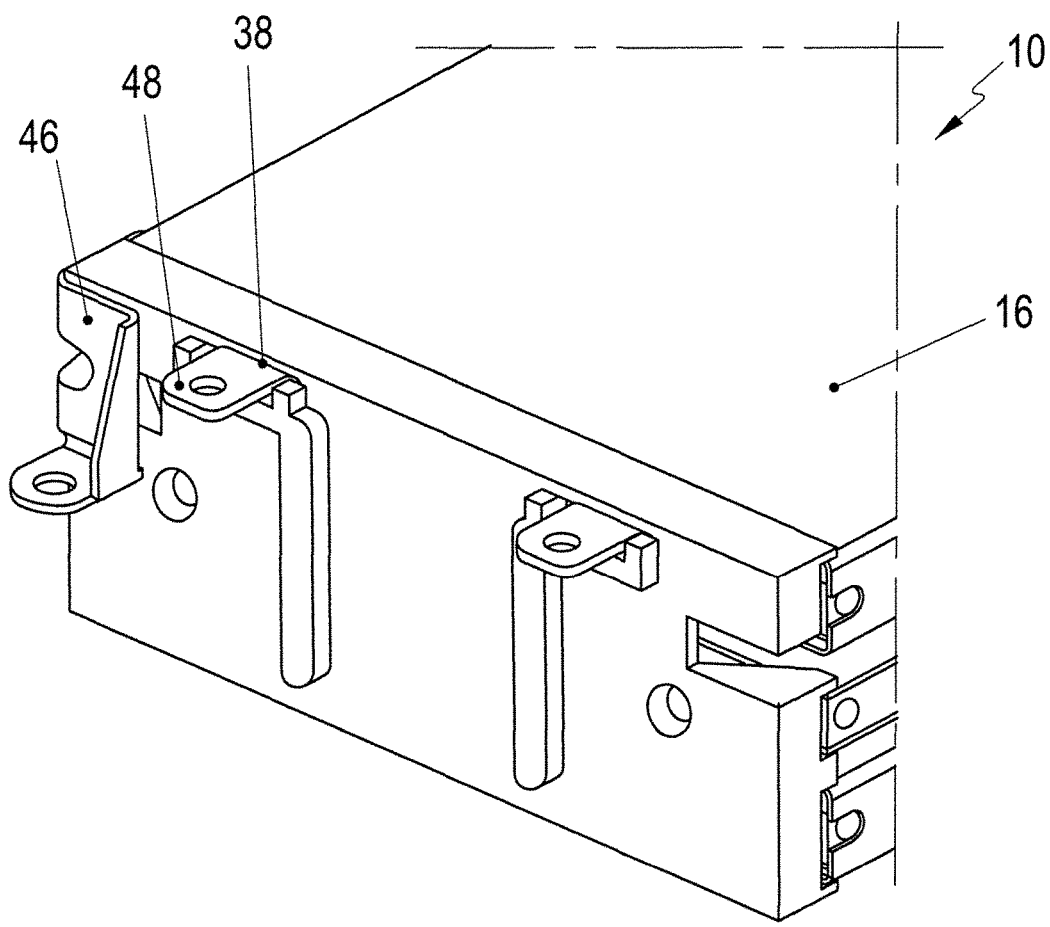

FIGS. 4a and 4b schematically show a variant connection of the battery cells 12. Identical elements are denoted by the same reference numerals, with only the special features being explained here.

In FIG. 4a, a third contact element 42 and a fourth contact element 44 are secured to the connecting element 20 to secure the contact lugs 18 of the battery cells 12 to the connecting element 20 in a force-fitting manner and to route the contacts to the outside. The third contact element 42 is connected to the connection lugs 18 of the upper battery cells 12. The fourth contact element 44 has the connection sections 48 for connection of the battery arrangement 10 and is connected to connection lugs 18 of the lower battery cells 12. The fourth contact element 44 is formed around the third contact element 42. As a result, the contact sections 48 can be routed through the openings 38 in the cover 36 and therefore can be connected on the outside. FIG. 4a shows a holder 46 that can be connected to the holes 26 to mount the battery arrangement 10.

FIG. 4b shows the assembled battery arrangement 10. The connection sections 48 are routed through the openings 38, and the holders 46 secure the cover 36 to the frame elements 14.

Figure 5:
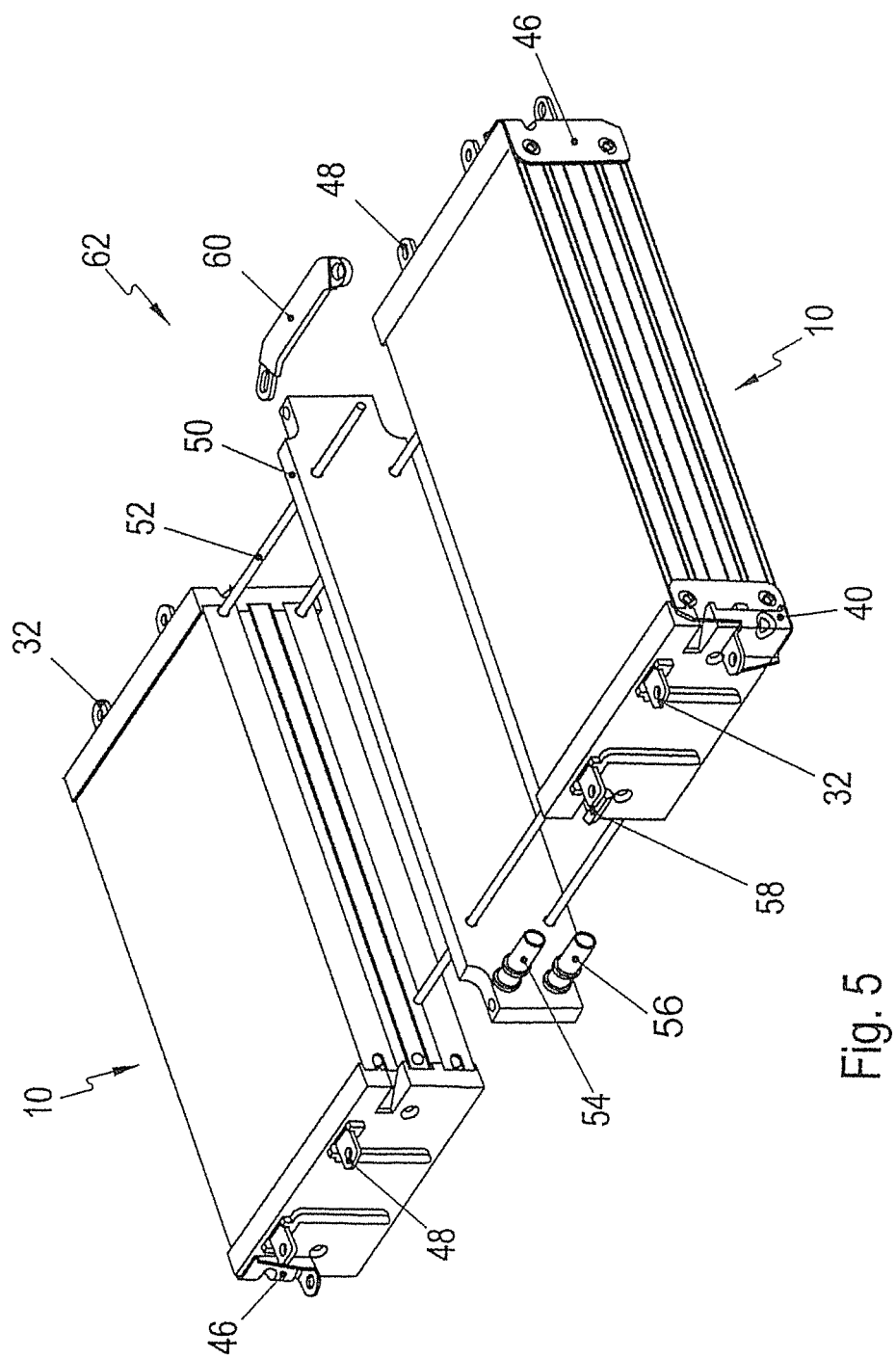
FIG. 5 is an exploded perspective view of two battery arrangements and a cooling element for cooling the battery arrangements.

FIG. 5 schematically shows an exploded illustration of two battery arrangements 10 to explain the mechanical connection of two battery arrangements to form a portion of a battery, for example, for a motor vehicle. The two battery arrangements 10 are connected laterally to one another, and a cooling element 50 is arranged between the battery arrangements 10. The two battery arrangements 10 are connected to one another and to the cooling element 50 by connecting rods 52 that are routed through the holes 26 and secured. The cooling element 50 has two coolant connection lines 54, 56 to connect the cooling element 50 to a cooling installation and to conduct coolant through the coolant lines of the cooling element 50. The cooling plates 16 make contact with the cooling element 50 to dissipate heat from the battery arrangements 10 via the cooling plates 16, the cooling element 50 and the coolant, and to prevent overheating of the battery arrangements 10. The battery arrangements 10 each have a temperature sensor 58 for controlling the cooling of the battery arrangements 10.

As shown in FIG. 5, electrical contact is made with the battery arrangements 10 on one side in the variant circuit of FIG. 3a and on the opposite side in the variant circuit of FIG. 4a. As a result, the individual battery cells 12 can be connected in series, and contact can be made with the individual battery cells as a complete package on the outside. For the individual battery arrangements 10 to make electrical contact with one another, the connection sections 32, 48 are connected electrically by a busbar 60. Thus, each connection section 48 makes contact with one connection section 32 to ensure series connection of the individual battery cells 12. The holding means 40, 46 accordingly are secured to the opposite sides of the respective battery arrangements 10 to mount the two battery arrangements 10 that are connected in this way. The two battery arrangements 10 connected in this way together form a battery block 62.

Figure 6:
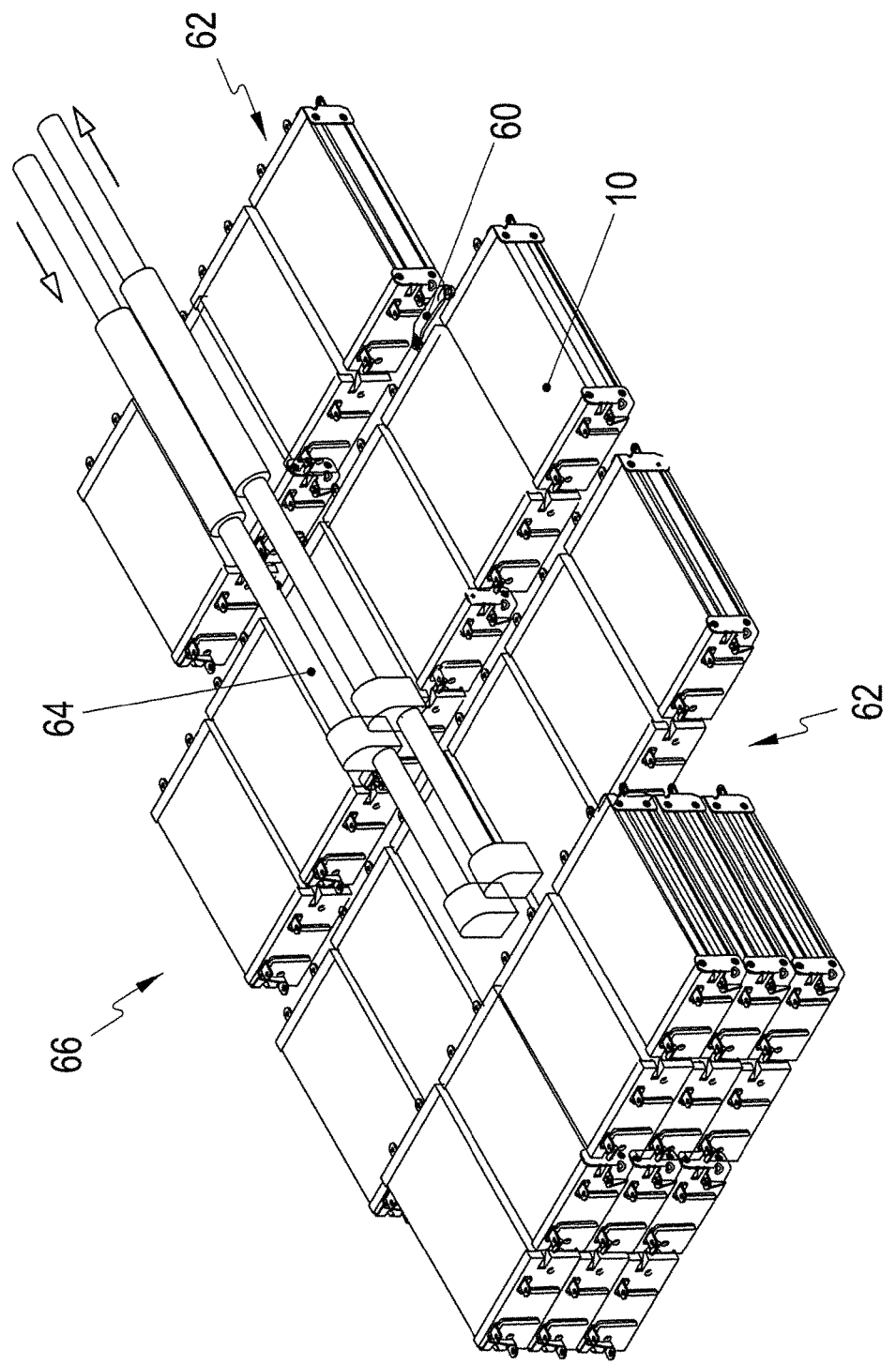
FIG. 6 is a perspective view of a battery comprising a large number of battery arrangements and a cooling system for cooling the battery arrangements.

FIG. 6 schematically shows a battery which is formed from a plurality of battery blocks 62 and is denoted generally by 66. Identical elements are denoted by the same reference numerals, with only the special features being explained here.

Some of the battery blocks 62 are arranged next to one another and some of the battery blocks are arranged one above the other to make optimum use of an available installation space, for example in a motor vehicle. The coolant connection lines 54, 56 of the respective battery blocks 62 are connected to a coolant system 64 to supply the individual cooling elements 50 with coolant and to dissipate heat produced in the battery cells and to prevent overheating of the battery cells 12.

What is claimed is:

1. A battery arrangement for a motor vehicle, comprising:
a plurality of rigid plate-shaped frame elements arranged substantially parallel to each other, each of the plurality of rigid plate-shaped frame elements having a first end and the first ends being substantially aligned with one another;
a plurality of battery cells for storing electrical energy, each of the plurality of battery cells having a first end, the first ends of the plurality of battery cells being aligned with one another and aligned with the first ends of the plurality of rigid plate-shaped frame elements, first and second flexible connection lugs projecting from the first end of the plurality of battery cells, the plurality of battery cells being arranged alternatingly between the plurality of rigid plate-shaped frame elements to define a stacked array;
a connecting element arranged on the first ends of the plurality of rigid plate-shaped frame elements, the connecting element being formed of an electrically insulating material and having fastening element apertures spaced from the first and second flexible connection lugs of the plurality of battery cells and aligned with the plurality of rigid plate-shaped frame elements, openings being formed in the connecting element inward of the fastening element apertures and through which the first and second flexible connection lugs are routed;
first and second electrically conductive contact elements mounted on the connecting element so that the first flexible connection lug is engaged between the connecting element and the first electrically conductive contact element, and so that the second flexible connection lug is engaged between the connecting element and the second electrically conductive contact element, one of the first and second electrically conductive contact elements having connection sections extending away from the plurality of rigid plate-shaped frame elements and the battery cells;
fastening elements extending from the plurality of rigid plate-shaped frame elements, through the connecting element and engaged with one of the first and second electrically conductive contact elements at positions spaced from the first and second flexible connection lugs so that the fastening elements secure the first and second flexible connection lugs between the connecting element and the respective first and second electrically conductive contact elements in a force-fitting manner without the fastening elements passing through the first and second flexible connection lugs;
a cover arranged to cover the connecting element and the first and second electrically conductive contact elements, with the connection sections extending through the cover; and
at least one holder having a side plate secured to a side extending angularly from the first end of at least one of the plurality of rigid plate-shaped frame elements and further having an end plate mounted to a surface of the cover facing away from the plurality of rigid plate-shaped frame elements, the end plate of the at least one holder holding the cover on the plurality of rigid plate-shaped frame elements and having a flange for mounting the battery arrangement.

2. The battery arrangement of claim 1, wherein each of the plurality of rigid plate-shaped frame elements has two opposite surfaces and has two battery cells of the plurality of battery cells associated respectively with the opposite surfaces of the plurality of rigid plate-shaped frame elements.

3. The battery arrangement of claim 2, further comprising metallic cooling plates arranged between the plurality of battery cells and the plurality of rigid plate-shaped frame elements.

4. The battery arrangement of claim 3, further comprising metallic cooling plates arranged on outer surfaces of the battery arrangement.

5. The battery arrangement of claim 3, further comprising a cooling water line thermally connected to the metallic cooling plates.

6. The battery arrangement of claim 5, further comprising at least one temperature sensor.

7. The battery arrangement of claim 1, wherein the first electrically conductive contact element electrically connects to the first flexible connection lug and wherein the second electrically conductive contact element electrically connects to the second flexible connection lug.

8. The battery arrangement of claim 1, wherein the first electrically conductive contact element makes electrical contact with the first flexible connection lugs of the plurality of battery cells and has the connection section that forms an electrical contact of the battery arrangement.

9. The battery arrangement of claim 1, wherein the plurality of battery cells are flexible battery cells.

* * * * *